(12) United States Patent
Titmas

(10) Patent No.: US 6,746,516 B2
(45) Date of Patent: Jun. 8, 2004

(54) METHOD AND APPARATUS FOR TREATING AIR EMISSIONS AND RECOVERING PRODUCTS THEREFROM

(76) Inventor: James A. Titmas, 3577 Yellow Creek Rd., Akron, OH (US) 44333-2221

(*) Notice: Subject to any disclaimer, the term of this patent is extended or adjusted under 35 U.S.C. 154(b) by 14 days.

(21) Appl. No.: 10/166,450

(22) Filed: Jun. 10, 2002

(65) Prior Publication Data

US 2003/0226445 A1 Dec. 11, 2003

(51) Int. Cl.⁷ ................................................. B01D 8/00
(52) U.S. Cl. ..................... 95/229; 62/55.5; 62/617; 95/288; 96/266
(58) Field of Search ..................... 62/606, 617, 55.5; 95/288, 228, 229; 96/242, 266, 270, 273

(56) References Cited

U.S. PATENT DOCUMENTS

| | | | | |
|---|---|---|---|---|
| 2,762,449 A | * | 9/1956 | Sweeney | |
| 2,805,931 A | * | 9/1957 | Hatcher et al. | |
| 3,081,068 A | * | 3/1963 | Milleron | |
| 4,211,541 A | * | 7/1980 | Fernandez | |
| 4,372,759 A | * | 2/1983 | Sederquist et al. | |
| 4,506,513 A | * | 3/1985 | Max | |
| 5,150,576 A | * | 9/1992 | Minzenberger | |
| 5,291,738 A | * | 3/1994 | Waldrop | |
| 5,422,081 A | * | 6/1995 | Miyagi et al. | |
| 5,512,084 A | * | 4/1996 | Mauterer | |
| 5,820,641 A | * | 10/1998 | Gu et al. | |
| 5,843,214 A | * | 12/1998 | Janes | |
| 5,928,412 A | * | 7/1999 | Bastholm et al. | |
| 6,019,819 A | * | 2/2000 | Williams | |
| 6,158,226 A | * | 12/2000 | Noji et al. | |

* cited by examiner

Primary Examiner—Duane S. Smith
(74) Attorney, Agent, or Firm—Renner, Kenner, Greive, Bobak, Taylor & Weber

(57) ABSTRACT

An air treatment system including an exhaust including an exhaust annulus defined by an inner exhaust wall, an outer exhaust wall circumscribing the inner wall, and a pressurized annulus between the inner and outer walls, and at least one condenser suspended within the exhaust annulus, where the at least one condenser includes a cooling fluid therein.

27 Claims, 7 Drawing Sheets

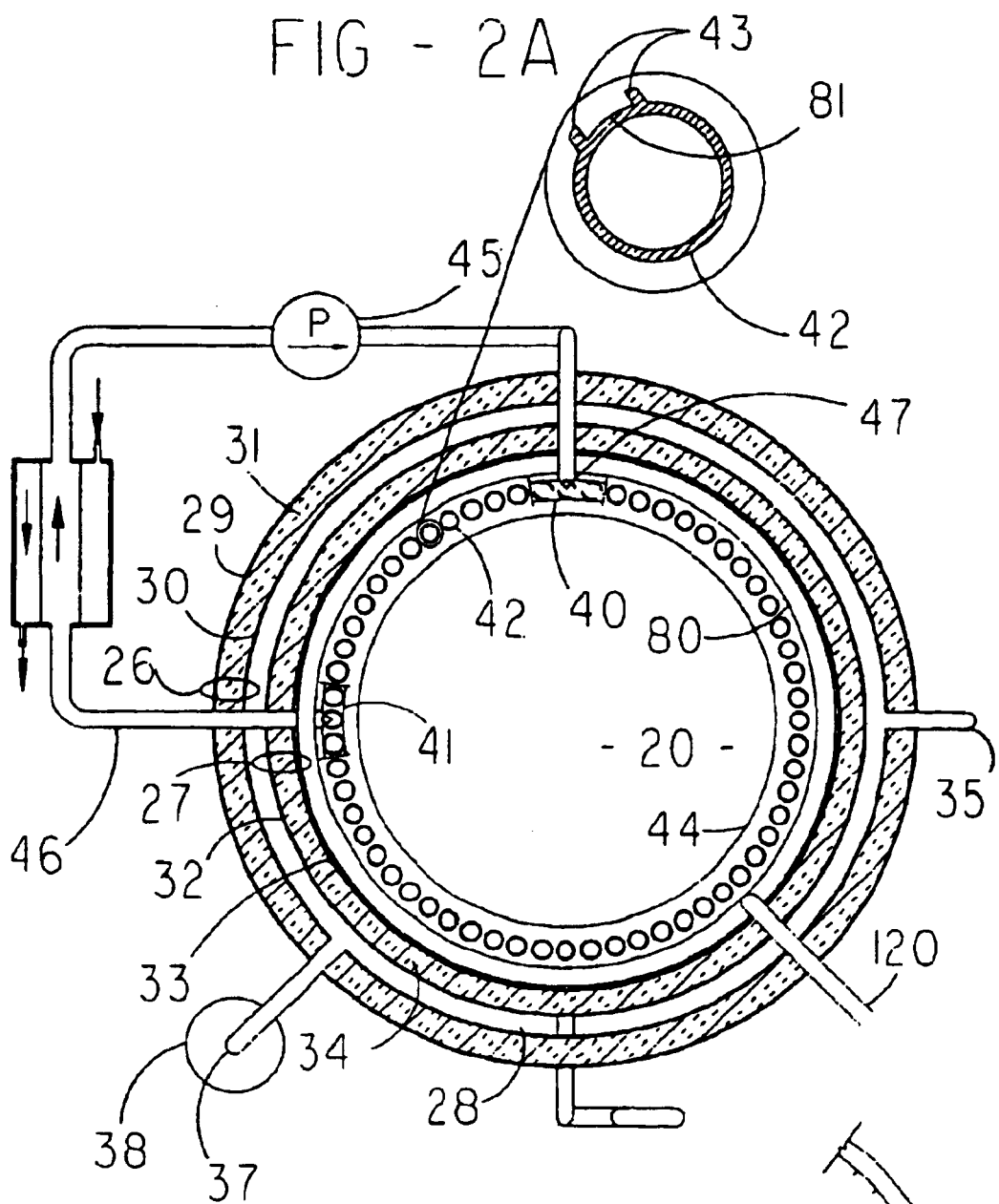
FIG - 2A
FIG - 2
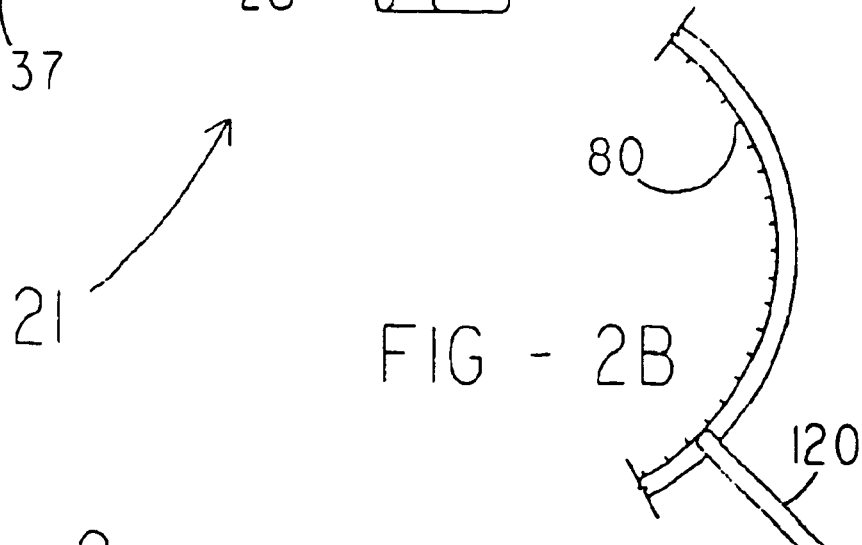
FIG - 2B

METHOD AND APPARATUS FOR TREATING AIR EMISSIONS AND RECOVERING PRODUCTS THEREFROM

FIELD OF THE INVENTION

This invention relates to a process whereby acid and particulate matter can be extracted from air emissions.

BACKGROUND OF THE INVENTION

In air combustion of hydrocarbons, including fossil fuels, waste oils, and organic debris, residual air emissions are deliberately maintained at a temperature well above the dew point of acids that may be formed during combustion. This temperature is maintained to prevent the condensation of acids on the air handling containment equipment, which condensation would ultimately lead to the corrosion of this equipment. This corrosion is caused by direct acid condensation and by pinhole leaks within the membranes of the metals that constitute the stacks, ducts, fans, scrubbers, and vents of the handling and containment equipment. In the case of pin hole leaks, cooler outside air is drawn into the negative pressure air exhaust passage, which causes acids to condense on the site of the pin hole leak and corrode the membranes, which leads to larger leaks. The same problem occurs as the stack gases are cooled during discharge, which may be done to recover heat energy or to capture and remove toxic metals such as mercury from the gas stream or other particulate matters such as unburned carbon and hydrocarbon compounds. In these instances, the acid will condense on the conduit, which likewise leads to the corrosion of the stack or chimney apparatus. A further complication of these problems is the deliberate under-combustion of fuels or organic debris in order to preclude the formation of nitrogen oxides. Combustion burner temperatures and burn duration are suppressed below the point of optimum combustion due to the inability to mitigate the impact of these acids on the equipment and the environment. These problems remain largely unsolved.

SUMMARY OF THE INVENTION

In general the present invention provides an air treatment system comprising an exhaust including an exhaust annulus defined by an inner exhaust wall, an outer exhaust wall circumscribing the inner wall, and a pressurized annulus between the inner and outer walls, and at least one condenser suspended within the exhaust annulus, where the at least one condenser includes a cooling fluid therein.

The present invention also includes a process for treating air emissions comprising directing combustion gases into an exhaust, where the exhaust includes an exhaust annulus defined by an inner wall, an outer wall circumscribing the inner wall, and a pressurized annulus between the inner wall and the outer wall, directing the combustion gases through at least one condenser, where the at least one condenser is suspended within the exhaust annulus, and where the at least one condenser includes a cooling fluid therein, thereby condenses compounds included within the combustion gases to condense into a condensate, collecting the condensate within the exhaust, and directing the condensate out of the exhaust.

Advantageously, the present invention overcomes the problems associated with the prior art by providing an exhaust condenser that deliberately cools exhaust gases and thereby condenses materials, such as acids, within the exhaust stream. These materials can then be captured and collected or further processed. As a result, the use of the exhaust condenser of this invention advantageously allows for the use or recycling of materials that would otherwise be discharged to the environment such as in the form of acid rain. Also, the exhaust condenser provides a means whereby heat energy form exhaust gases can be recovered.

BRIEF DESCRIPTION OF THE DRAWINGS

FIG. 2 is a fragmented elevational sectional view of an exhaust condenser.

DETAILED DESCRIPTION OF ILLUSTRATIVE EMBODIMENTS

Figure 1:
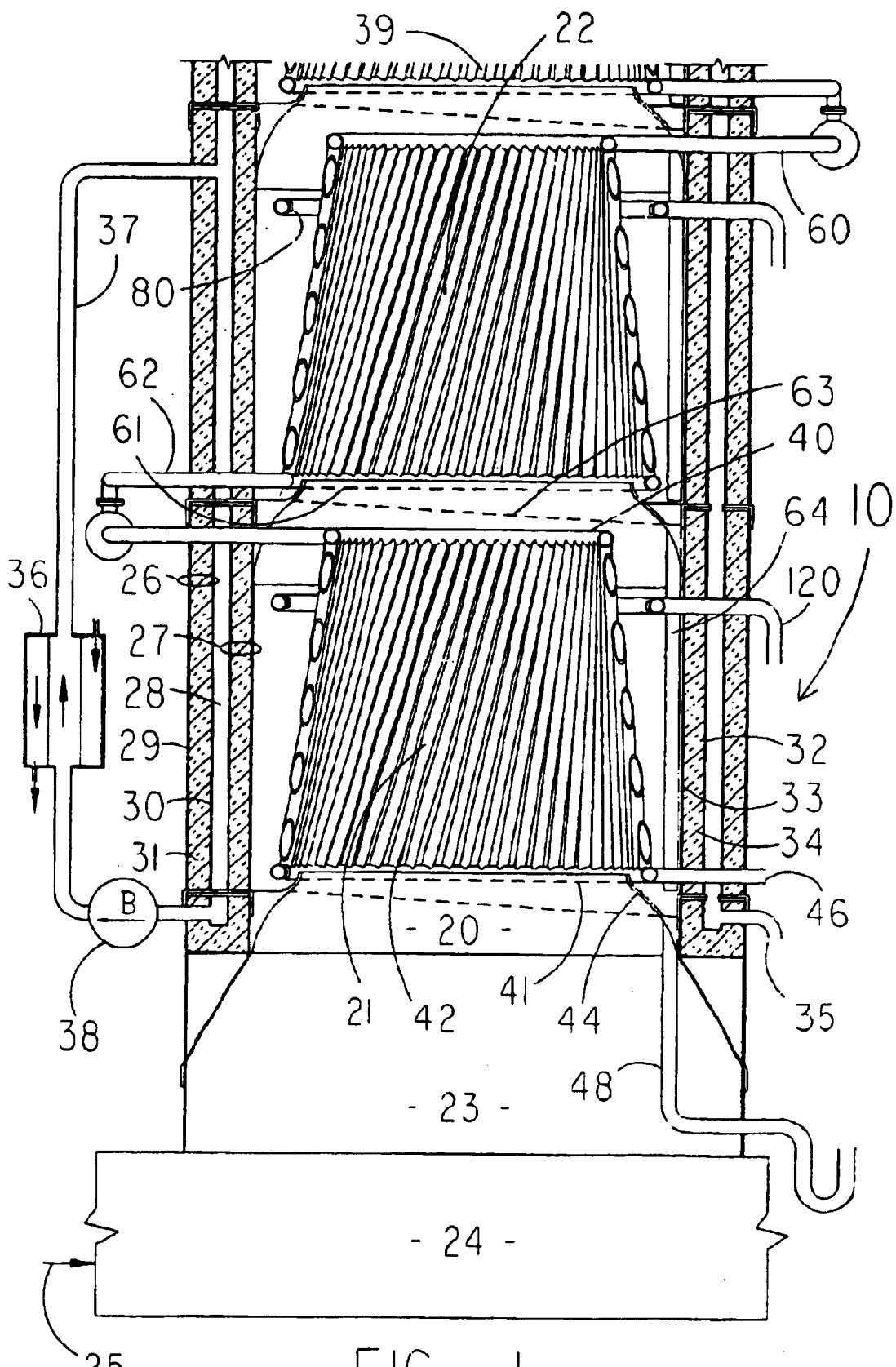
FIG. 1 is a fragmented vertical, cross-sectional view of an exhaust condenser.

The exhaust condenser of the present invention can be described with reference to FIG. 1. Exhaust condenser 10 generally includes an exhaust 20 and at least on one condenser 21. Although exhaust condenser 21 of FIG. 1 includes a second condenser 22, only one condenser is required in practicing the present invention. The term exhaust is a generic term that includes stacks, which typically refer to forced air emission conduits, and chimneys, which are typically natural draft conduits; nonetheless, the terms exhaust, stack, and chimney are used interchangeably herein.

Exhaust condenser 20 is in fluid connection with exhaust conduit 23 from combustion chamber 24. Combustion chambers can include, but are not limited to, boilers, engines, heaters, and incinerators. As is conventional in the art, combustion chamber 24 is fueled by a fuel source such as 25, and may also be air fed by employing a conventional blower. In practicing the present invention, it is preferred to augment the air and fuel source with oxygen or other oxidants. These oxidants are used to raise the burner above about 1,700° C. and thereby deliberately induce the combustion of atmospheric nitrogen and effect a more complete oxidation of the fuel or waste stream being treated.

As also shown in FIG. 2, exhaust 21, which is preferably cylindrical in nature, has an outer diameter defined by outer exhaust wall 26. Spaced within and circumscribed by outer exhaust wall 26 is an inner exhaust wall 27. The area between outer exhaust wall 26 and inner exhaust wall 27 define an annulus space 28, which is sealed at the top and bottom. In a preferred embodiment, outer exhaust wall 26 and inner exhaust wall 27 are insulated shells. For example, outer exhaust wall 26 includes an outer shell 29 and an inner shell 30, and the space there between is filled with an insulating material 31. Inner exhaust wall 27 likewise includes an outer shell 32 and an inner shell 33, and the space there between is filled with an insulating material 34. Useful insulating materials include fiberglass, ceramic blankets, and the like.

Annulus space 28 is charged with gases that preferably inhibit corrosion. An exemplary gas includes nitrogen. The pressure of the gases within annulus 28 is generally from about 1.1 to about 1.2 atmospheres. This pressure is preferably maintained by a variable feed supply 35. Also, the temperature of the gases within annulus space 28 is preferably maintained at a temperature of about 145 to about 175° C. This is preferably accomplished by extracting the gas via a blower 38, warming the gas at heat exchanger 36, and reintroducing the gas into annulus space 28 via conduit 37. In one embodiment, heat extracted from the exhaust gases are employed within heat exchanger 36.

Condenser 21 is preferably suspended within exhaust annulus 20. Condenser 21 includes an upper manifold 40, a lower manifold 41, and vertical cooling conduits 42, which are in fluid communication with the upper manifold 40 and lower manifold 41. Vertical cooling conduits 42 are positioned adjacent to one another and are preferably spaced from about ½ to 2 cm apart from one another. Also, vertical cooling conduits 42 are preferably positioned at an angle α of from about 75° to about 85° with respect to the lower manifold 41. This angle is accomplished by employing an upper manifold 40 that is smaller in diameter than the lower manifold 41. Also, vertical cooling conduits 42 are canted angle β, which is from about 5° to about 10° between upper and lower manifolds 40 and 41. The cross-sectional shape of vertical cooling conduits 42 can be circular, elliptical, octagonal, or rectangular.

In one embodiment, as shown in FIG. 2A, the vertical cooling conduits 42 will include fins 43. These fins extend along the vertical axis of the cooling conduits 42 and are positioned on the outer circumference of condenser 21. In other words, vertical cooling conduits 42 are positioned so that fins 43 are adjacent to inner exhaust wall 27. Fins 43 advantageously serve to guide and shield condensed acids and rinse water as they travel along vertical cooling conduit 42 toward trough 44 (shown in FIG. 1).

A cooling fluid, such as water, is pumped through the condenser. Preferably, the cooling fluid is modified with an anti-freeze, such as ethylene glycol, as may be appropriate to manage temperature and corrosive complications. The cooling fluid may be pumped through condenser by employing a pump 45 that can pump water via conduit 46 into an inlet 47 located within upper manifold 40. The cooling water is distributed along upper manifold 40, flows downward through each vertical cooling conduit 42, is collected in lower manifold 41, and is discharged form lower manifold 41 via outlet 46. The cooling fluid preferably has an initial temperature, e.g., at upper manifold 40 of below about 120° C., more preferably below about 100° C., and even more preferably below about 80° C.

As shown in FIG. 1, condenser 21 is preferably suspended within exhaust annulus 20 in a manner that will allow it to freely expand and contract therein, while remaining secure from vibration or draft-induced movement. In one embodiment, condenser 21 is suspended within exhaust annulus 20 by supporting it on top of a trough 44 that extends around the inner diameter of exhaust annulus 20, i.e., around the inner diameter of inner exhaust wall 27. Trough 44 is preferably positioned at an angle so as to create positive drainage flow toward trough drain 46.

Figure 7:
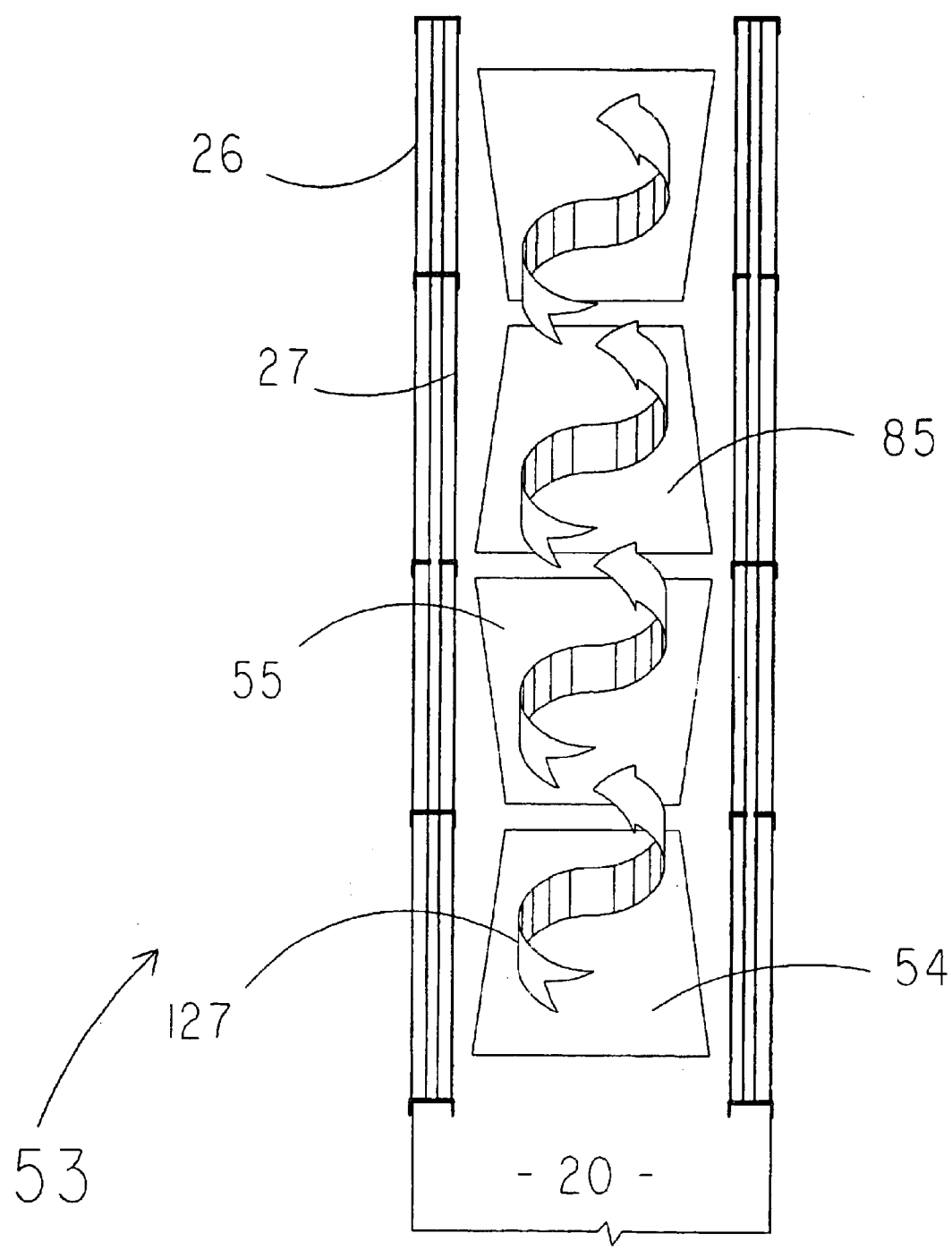
FIG. 7 is a diagram that shows the air-flow pattern of exhaust gases moving through an exhaust condenser of one embodiment of the present invention.

During normal operation, exhaust gases that are released from combustion chamber 24 are directed into exhaust annulus 20 via exhaust conduit 23. As these gases proceed up through exhaust annulus 20, they come into contact with condenser 21. Because the condenser is at a lower temperature (e.g., below about 300° C.) than the exhaust gases, acids within the exhaust gas will condense upon contact. Where the vertical cooling conduits 42 are canted, centripetal forces that are caused by the exhaust gases flowing through the canted vertical cooling conduits 42 will advantageously assist in the mixing of the exhaust stream and the separation of condensing droplets from the exhaust gas. This configuration advantageously avoids the need to place cooling tubulars directly in the exhaust stream, which would induce and undesirable loss of motive force in the exhaust gas flow. Also, as shown in FIG. 7, the angle and canting of vertical cooling conduits 42 (FIG. 1) will cause the gases to spin (as generally shown by path 127) as they travel upward, which will thereby direct the condensed acids toward the inner wall 27 of stack annulus 20 so that the condensed acids can ultimately be collected within trough 44. The acids can then be conveyed out of trough 44 via drain 48.

Figure 3:
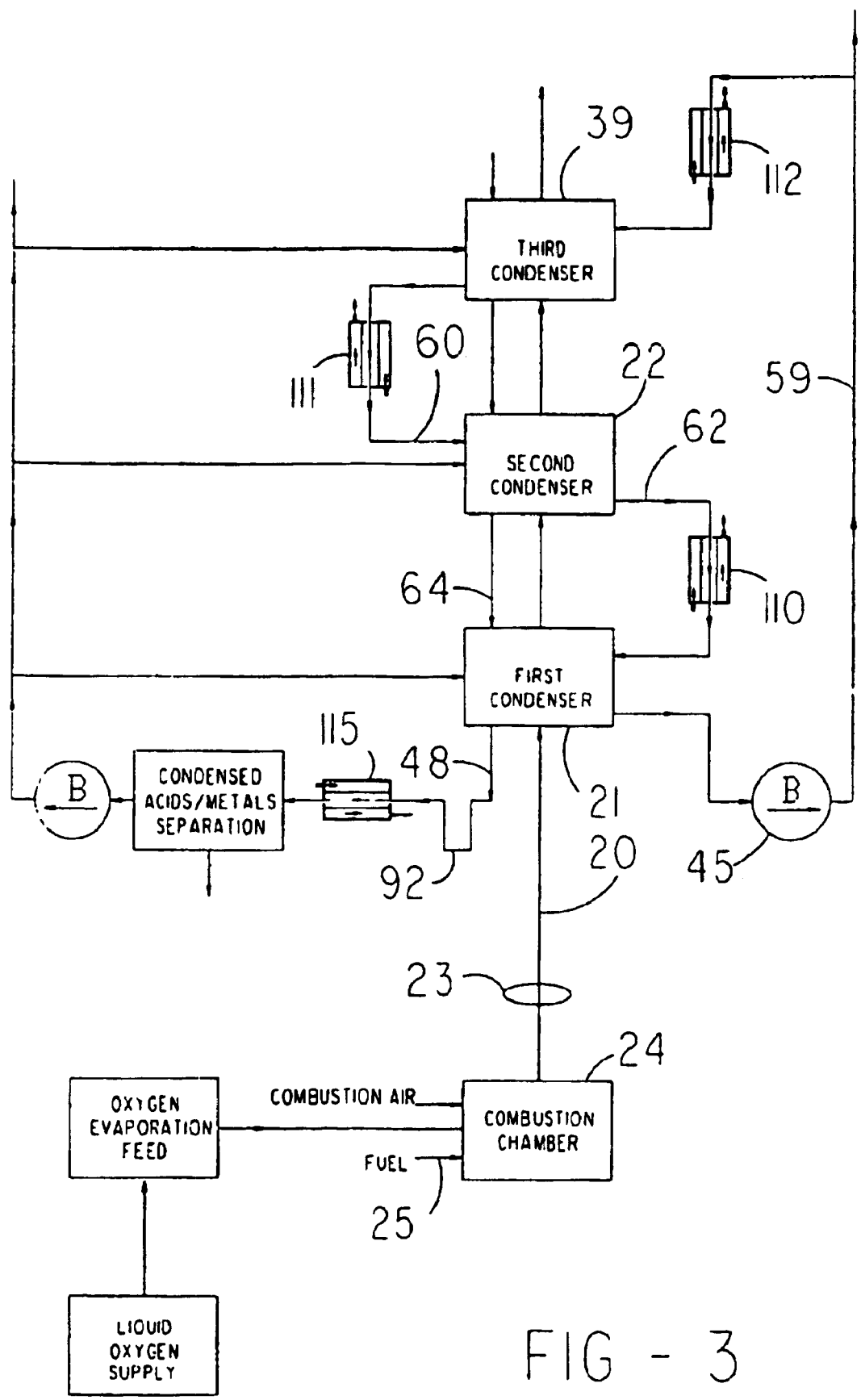
FIG. 3 is a schematic diagram of a preferred overall process of one embodiment of the present invention.

As shown in FIG. 3, one embodiment of this invention includes an exhaust condenser including three condensers, 21, 22, and 39. Each condenser if fed by one continuous cooling fluid line 59, which may be equipped with heat exchanges 110, 111, and 112.

As shown in FIG. 1, the cooling fluid can be introduced into top condenser 22 at inlet 60, and is removed from top condenser 22 at outlet 62. The fluid exiting top condenser 22 can then be directed into lower condenser 21 via conduit 59 (as shown in FIG. 3). In a similar fashion, the fluid is removed from lower condenser 21 at outlet 46 and ultimately removed from the stack condenser 21 for cooling and recirculation.

Acid collected within upper trough 63 is removed from the trough via drain 64, which can then be directed toward a lower trough 44. As also shown in FIGS. 1 and 3, acid collected within lower trough 44, which results from both condensation from lower condenser 21 and from drain 64, can be directed out of stack condenser 26 via drain 48. Also, stack condenser 21 can include a lower drain (not shown), which may be employed to collect and remove residual acid that is not collected within the troughs.

Figure 4:
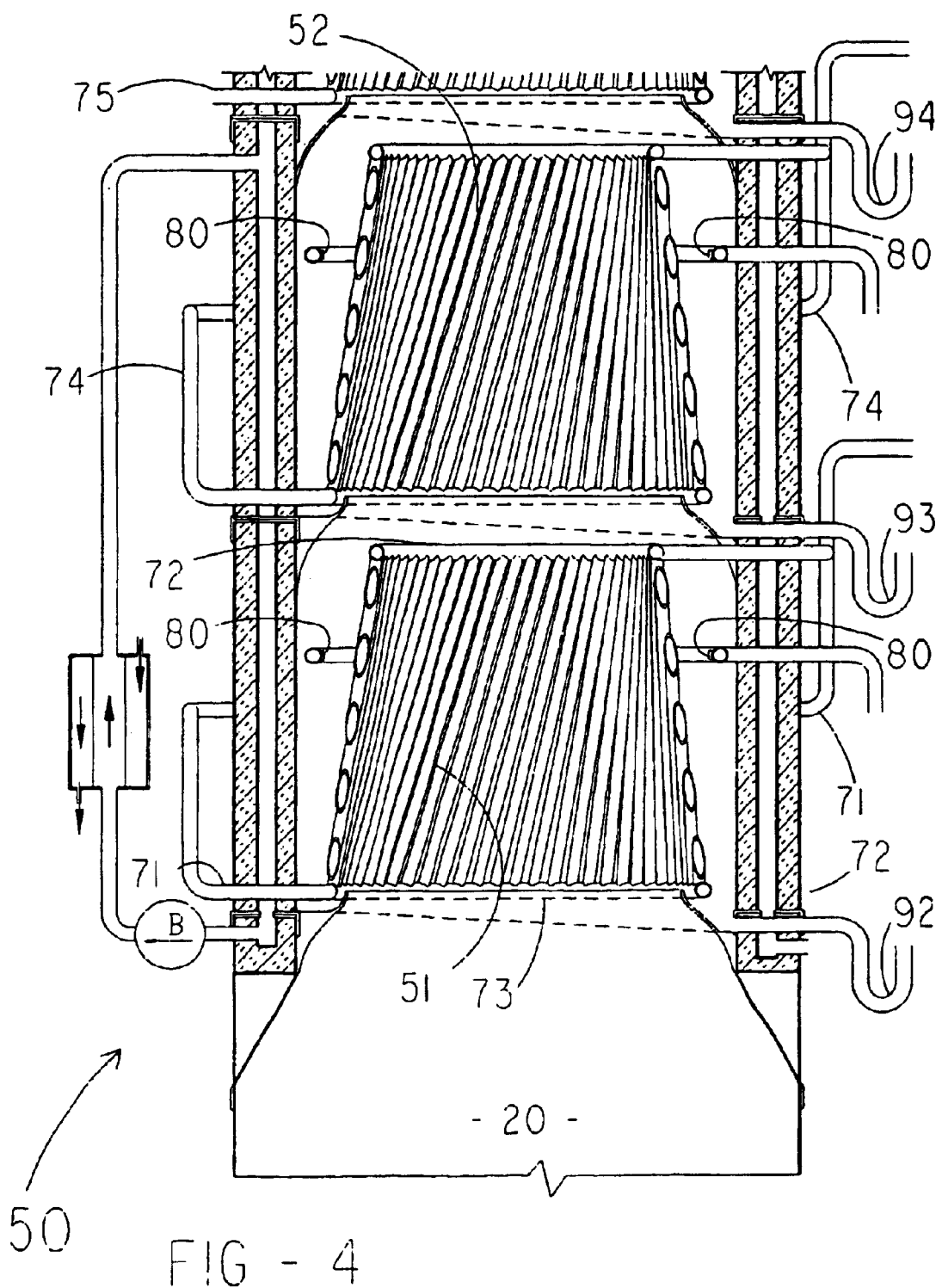
FIG. 4 is a fragmented vertical, cross-sectional view of an exhaust condenser having separate cooling and collection feeds.
Figure 5:
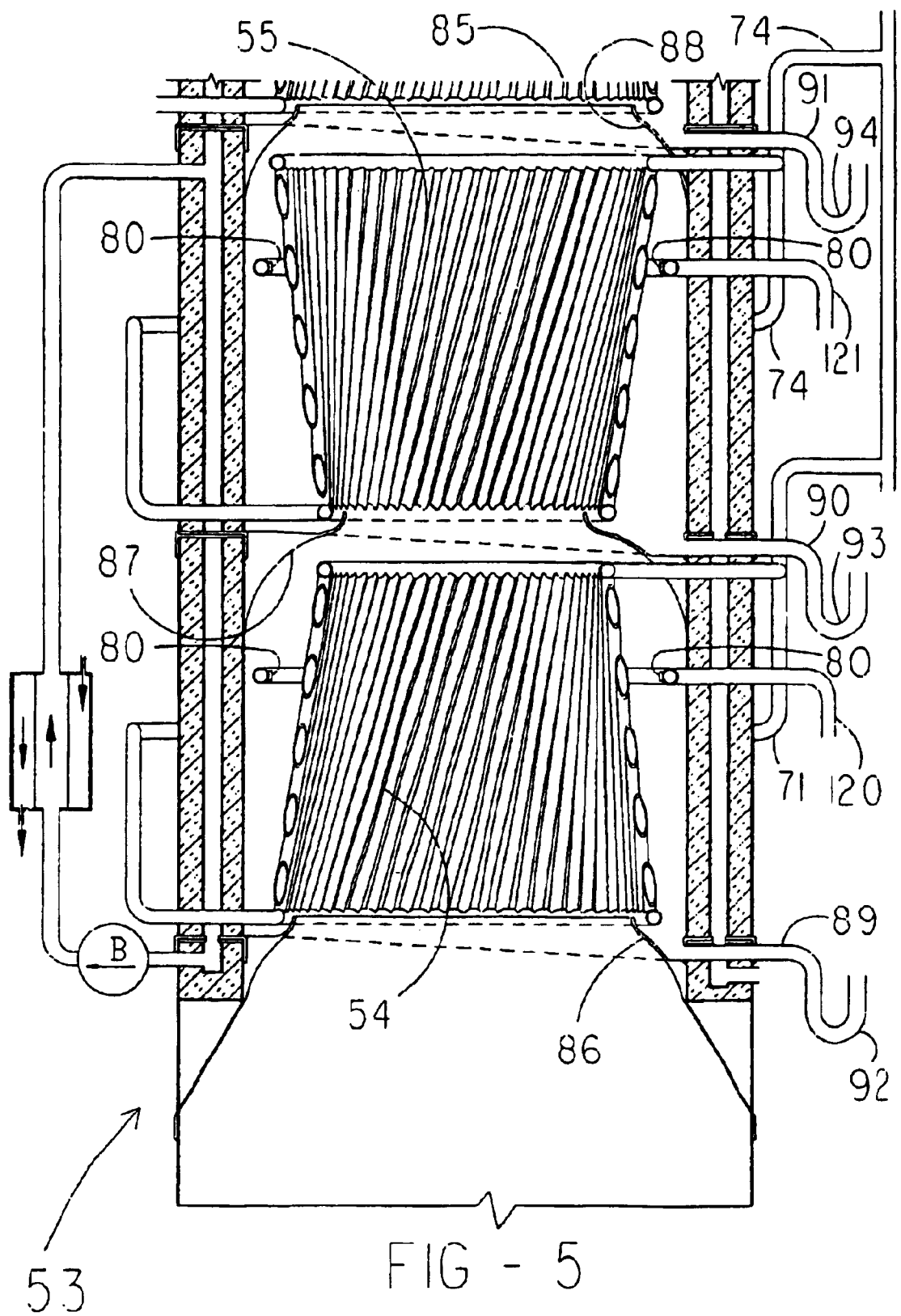
FIG. 5 is an alternate configuration of the exhaust condenser of FIG. 4.

In another embodiment, exhaust condenser 50 includes at least two condensers 51 and 52, as shown in FIG. 4. In an alternate embodiment, as shown in FIG. 5, exhaust condenser 53 likewise includes at least two condensers 54 and 55, where condenser 55 is positioned above condenser 54 in an inverted manner. This positioning advantageously effects a venturi effect that enhances mixing while minimizing overall draft losses. In an especially preferred embodiment the exhaust condenser 53 will include at least three condensers 54, 55, and 85, as partially shown in FIG. 5, and more fully shown in FIG. 6.

Figure 6:
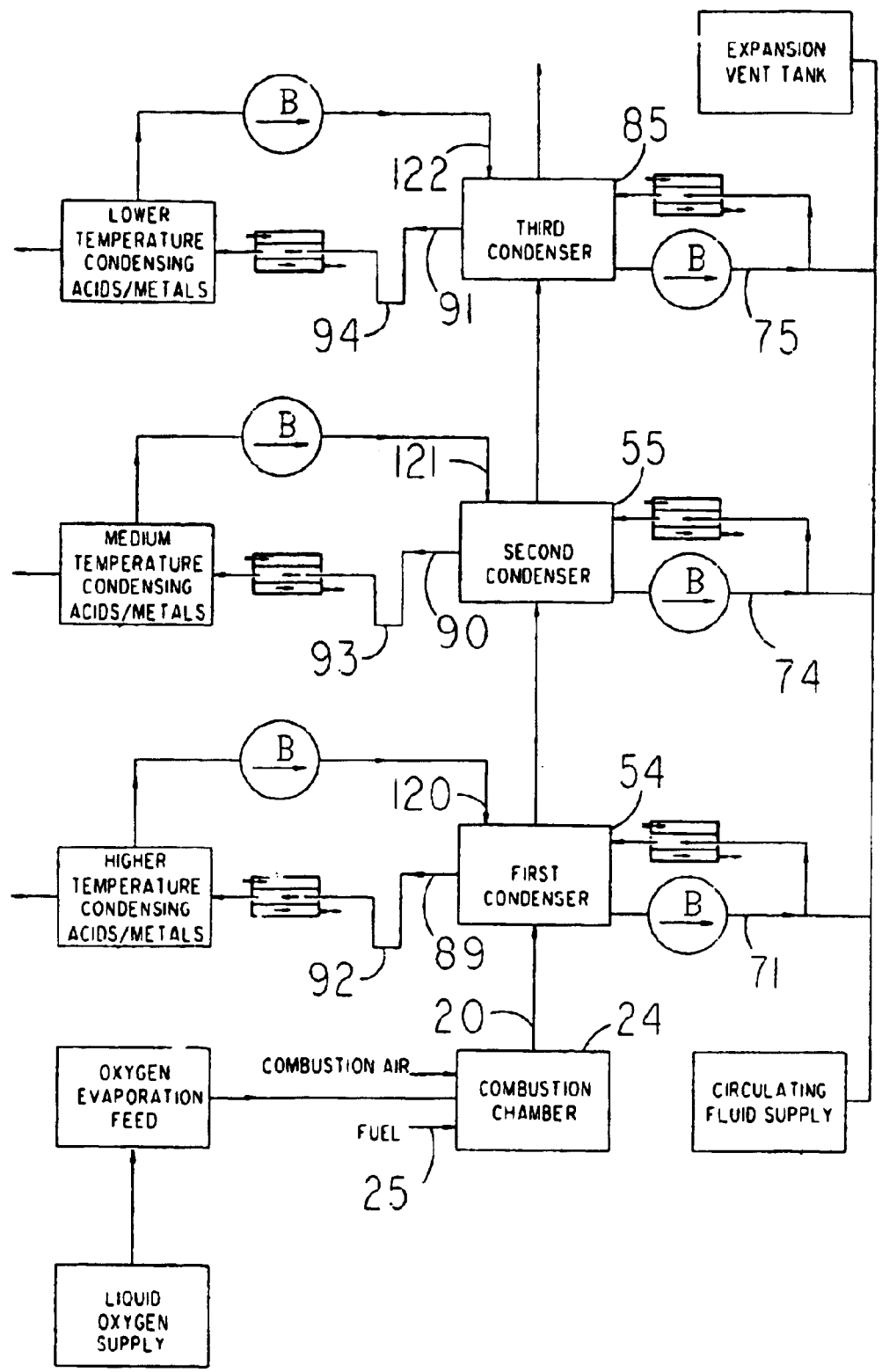
FIG. 6 is a schematic diagram of a preferred overall process of one embodiment of the present invention.

As shown in FIG. 6, each condenser can be cooled to a specific temperature so that acids and other substances within the exhaust stream can be selectively removed and collected. For example, with reference to FIG. 4, lower condenser 51 can be cooled to a temperature of about 150 to about 300° C. At this temperature, sulfur oxide acids and mercury, as well as other metals that are partially oxidized and to some degree soluble within water, can be condensed. The temperature of the lower condenser is preferably maintained by an independent cooling loop 71. In other words, and as shown in FIG. 4, coolant is delivered to upper manifold 72 via conduit 71, removed from lower manifold 73 via conduit 71, cooled if desired, and redelivered to upper manifold 72 via conduit 71.

With reference again to FIG. 6, second condenser 55 is positioned above lower condenser 54. This condenser is preferably maintained at a temperature of about 100° to about 125° C. At this temperature, acids including hydrochloric and acetic acids will condense, and further removal of mercury and other metals will occur as well as carbon and some particulate hydrocarbons that are partially oxidized and may or may not be soluble in water. The temperature of second condenser 55 is preferably maintained by an independent cooling loop 74, which operates in a similar fashion to that described for the lower condenser.

Third condenser 85 is positioned above second condenser 55. Third condenser 85 is maintained at a temperature of about 70° C. to about 100° C. At this temperature, acids including oxides and nitrogen will condense, and further removal of metals that are partially oxidized and may or may not be soluble in water can be isolated, as well as condensation formed from contaminants such as dioxin. The temperature is maintained in third condenser 85 via an independent cooling loop 75 as described above with respect to the other condensers.

In one embodiment, water can be introduced into exhaust annulus 20 via nozzle 80, as shown in FIGS. 4 and 5. Preferably, nozzle 80, which is also shown in FIG. 2B, sprays the water onto the vertical cooling conduits 42. As a result, water mixes with condensate to produce a fluid mixture that can be readily extracted from the exhaust condenser without plugging. In a preferred embodiment, the exhaust condenser includes a plurality of nozzles 80 as shown in FIG. 5.

The pH of the water for spray 80 may be lowed prior to delivery to the exhaust condenser (e.g., a pH of about 3 to about 6) by using the acid targeted for extraction at the respective condensers 54, 55, and 85, as shown in FIG. 6. In other words, the water and condensate recovered from the process can be reintroduced into the condenser via nozzle 80. By employing the condensate recovered from the process, the use of the apparatus of this invention provides a method whereby the acid concentration of the condensate can be concentrated.

It may also be desirable to separately extract the condensate from the stack condenser 56. Accordingly, and as shown in FIG. 5, each condenser, 54, 55, and 85, is supported on respective troughs 86, 87, and 88, and each trough is in fluid communication with separate drains, i.e., drains 89, 90, and 91, respectively. These troughs can remove the condensate from each condenser for further processing or collection. In one embodiment, as shown in FIG. 6, each drain is in fluid communication with a trap, e.g., traps 92, 93, and 94, which serve to manage the variable pressure differential between the interior stack condenser and the atmosphere. Also, the condensate being removed via each drain, i.e., drains 89, 90, and 91, can be cooled by use of heat exchangers, which are not shown. In a preferred embodiment, the heat recovered from the condensate stream can be recovered and reused in the process. Also, the condensate can be further processed to separate particulate from the condensate streams, which should be acid enriched.

While the preferred embodiment includes three condensers, as shown in FIG. 6, it is emphasized that the preferred stack condenser includes at least three condensers. In other words, the stack condenser can include a multitude of condensers that can operate based upon independent cooling loops and extraction configurations or on shared cooling loops and shared extraction mechanisms, or a combination thereof. In fact, the number of condensers and the grouping by zone would preferably be selected based upon the total heat that would be required to be removed from the system to cause the precipitation of fluids form the exhaust gases. For example, this could be as many as 30 to 60 condensers for a major installation.

Various modifications and alterations that do not depart from the scope and spirit of this invention will become apparent to those skilled in the art. This invention is not to be duly limited to the illustrative embodiments set forth herein.

What is claimed is:

1. An air treatment system comprising:
    an exhaust including an exhaust annulus defined by an inner exhaust wall, an outer exhaust wall circumscribing the inner wall, and a pressurized annulus between the inner and outer walls, where the pressurized annulus includes and inert gas that is heated to a temperature of about 145° to about 175° C.; and
    at least one condenser suspended within the exhaust annulus, where the at least one condenser includes a cooling fluid therein.

2. The stack condenser of claim 1, where the condenser includes an upper manifold, a lower manifold, and vertical cooling conduits.

3. The stack condenser of claim 2, where the vertical conduits include fins extending along the vertical axis of the cooling conduits.

4. The stack condenser of claim 2, where the vertical cooling conduits are positioned at an angle of from about 75° to about 85° with respect to the lower manifold, and where the vertical cooling conduits are canted at an angle from about 5° to about 10° between the upper and lower manifold.

5. The stack condenser of claim 1, where the cooling fluid is cooled to a temperature of below about 120° C.

6. The stack condenser of claim 1, where the condenser is suspended within the stack annulus by supporting the condenser on top of a trough that extends around the inner diameter of the inner stack wall.

7. The stack condenser of claim 1, where the air treatment system includes two or more condensers suspended within the exhaust annulus, and where the cooling fluid is introduced into a first condenser is transferred from the first condenser to a second condenser, removed from the second condenser, and directed out of the exhaust.

8. The stack condenser of claim 1, where the air treatment system includes at least three condensers, and where a first condenser includes a cooling fluid maintained at a temperature of about 150° to about 300° C., where a second condenser includes a cooling fluid maintained at a temperature of about 100° to about 125° C., and where a third condenser includes a cooling fluid maintained at a temperature of about 70° to about 100° C.

9. The stack condenser of claim 2, where the exhaust includes a nozzle whereby water can be sprayed onto the vertical cooling conduits.

10. The stack condenser of claim 9, where the water includes condensate previously extracted from the system.

11. The stack condenser of claim 8, where the exhaust includes at least three troughs that extend around the inner diameter of the inner wall and on top of which the first, second, and third condensers are positioned, respectively, and, where each trough collects condensate that is formed by each of the respective condensers.

12. A process for treating air emissions comprising:
    directing combustion gases into an exhaust, where the exhaust includes an exhaust annulus defined by an inner wall, an outer wall circumscribing the inner wall, and a pressurized annulus between the inner wall and the outer wall;

directing the combustion gases through at least one condenser, where the at least one condenser is suspended within the exhaust annulus, and where the at least one condenser includes a cooling fluid therein, thereby condensing compounds included within the combustion gases to condense into a condensate;

collecting the condensate within the exhaust; and directing the condensate out of the exhaust.

13. The process of claim 12, where said step of directing the combustion gases through a condenser includes directing the combustion gases through at least three condensers, where the first condenser includes a cooling fluid maintained at a temperature of about 150° to about 300° C., where a second condenser includes a cooling fluid maintained at a temperature of about 100° to about 125° C., and where a third condenser includes a cooling fluid maintained at a temperature of about 70° to about 100° C., and thereby selectively condensing compounds within the combustion gases into separate condensate streams.

14. The process of claim 12, where the at least one condenser is configured so as to cause the condensate to be forced toward the inner wall of the exhaust.

15. The process of claim 12, where the condenser includes an upper manifold, a lower manifold, and vertical cooling conduits and where the vertical cooling conduits are positioned at an angle of from about 75° to about 85° with respect to the lower manifold, and where the vertical cooling conduits are canted at an angle from about 5° to about 10° between the upper and lower manifold.

16. The process of claim 12, further comprising the step of spraying water on the at least one condenser, which thereby dilutes the condensate for removal from the exhaust.

17. The process of claim 1 wherein the pressure of the inert gas is from 1.1 to about 1.2 atmospheres.

18. An air treatment system comprising:

an exhaust including an exhaust annulus defined by an inner exhaust wall, an outer exhaust wall circumscribing the inner wall, and a pressurized annulus between the inner and outer walls; and at least one condenser suspended within the exhaust annulus, where the at least one condenser includes a cooling fluid therein, where the condenser includes an upper manifold, a lower manifold, and vertical cooling conduits.

19. The stack condenser of claim 18, where the vertical conduits include fins extending along the vertical axis of the cooling conduits.

20. The stack condenser of claim 19, where the vertical cooling conduits are positioned at an angle of from about 75° to about 85° with respect to the lower manifold, and where the vertical cooling conduits are canted at an angle from about 5° to about 10° between the upper and lower manifold.

21. The stack condenser of claim 20, where the cooling fluid is cooled to a temperature of below about 120° C.

22. The stack condenser of claim 21, where the condenser is suspended within the stack annulus by supporting the condenser on top of a trough that extends around the inner diameter of the inner stack wall.

23. The stack condenser of claim 22, where the air treatment system includes two or more condensers suspended within the exhaust annulus, and where the cooling fluid is introduced into a first condenser, is transferred from the first condenser to a second condenser removed from the second condenser, and directed out of the exhaust.

24. The stack condenser of claim 23, here the air treatment system includes at least three condensers, and where a first condenser includes a cooling fluid maintained at a temperature of about 150° to about 300° C., where a second condenser includes a cooling fluid maintained at a temperature of about 100° to about 125° C., and where a third condenser includes a cooling fluid maintained at a temperature of about 70° to about 100° C.

25. The stack condenser of claim 24, here the exhaust includes a nozzle whereby water can be sprayed onto the vertical cooling conduits.

26. The stack condenser of claim 25, here the water includes condensate previously extracted from the system.

27. The stack condenser of claim 26, where the exhaust includes at least three troughs that extend around the inner diameter of the inner wall and on top of which the first, second, and third condensers are positioned, respectively, and, where each trough collects condensate that is formed by each of the respective condensers.

* * * * *